US009628225B2

(12) United States Patent
Lim et al.

(10) Patent No.: US 9,628,225 B2
(45) Date of Patent: Apr. 18, 2017

(54) APPARATUS AND METHOD FOR TRANSMITTING DATA BASED ON COOPERATION OF MEMBER NODES BELONGING TO MULTICAST GROUP

(71) Applicant: SAMSUNG ELECTRONICS CO., LTD., Suwon-si (KR)

(72) Inventors: Jong Bu Lim, Yongin-si (KR); Kyung Hun Jang, Suwon-si (KR); Won Jae Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 14/164,538

(22) Filed: Jan. 27, 2014

(65) Prior Publication Data
US 2014/0254460 A1  Sep. 11, 2014

(30) Foreign Application Priority Data
Mar. 11, 2013 (KR) .......... 10-2013-0025699

(51) Int. Cl.
*H04H 20/71* (2008.01)
*H04L 1/18* (2006.01)
*H04L 1/00* (2006.01)

(52) U.S. Cl.
CPC .......... *H04L 1/1874* (2013.01); *H04L 1/0076* (2013.01); *H04L 2001/0093* (2013.01)

(58) Field of Classification Search
CPC ................ H04L 1/0076; H04L 1/1874; H04L 2001/0093; H04W 72/00
USPC ........................................................ 370/312
See application file for complete search history.

(56) References Cited

U.S. PATENT DOCUMENTS

| 6,505,253 | B1* | 1/2003 | Chiu .................... H04L 12/1868 370/229 |
| 7,586,930 | B2 | 9/2009 | Koski |
| 2003/0200499 | A1* | 10/2003 | Khayrallah ........... H04L 1/0009 714/776 |
| 2008/0002727 | A1 | 1/2008 | Yamane |
| 2008/0288592 | A1 | 11/2008 | Lee et al. |
| 2009/0061887 | A1* | 3/2009 | Hart ...................... H04W 24/10 455/450 |
| 2009/0276674 | A1 | 11/2009 | Wei et al. |
| 2010/0002695 | A1* | 1/2010 | Cheung ................... H04L 45/16 370/390 |
| 2010/0027505 | A1* | 2/2010 | Breuer .............. H04W 36/0055 370/331 |

(Continued)

FOREIGN PATENT DOCUMENTS

JP    2009-207147    9/2009

OTHER PUBLICATIONS

International Search Report issued May 22, 2014 in counterpart International Patent Application No. PCT/KR2014/001104 (3 pages).

*Primary Examiner* — Mang Yeung
(74) *Attorney, Agent, or Firm* — NSIP Law

(57) ABSTRACT

Methods and apparatuses for transmitting data based on cooperation of member nodes belonging to a multicast group is provided. The method may include transmitting multicast packets through a first communication network to member nodes belonging to a multicast group and the member nodes receiving the same multicast packets; and retransmitting the multicast packets upon determination that no member node has completed reception of the multicast packets.

15 Claims, 13 Drawing Sheets

(56) References Cited

U.S. PATENT DOCUMENTS

| | | |
|---|---|---|
| 2010/0235703 A1 | 9/2010 | Yang et al. |
| 2011/0199941 A1 | 8/2011 | Ouellette et al. |
| 2011/0211517 A1 | 9/2011 | Moscibroda et al. |
| 2011/0299526 A1 | 12/2011 | Wu et al. |
| 2012/0257514 A1 | 10/2012 | Allan et al. |
| 2012/0275324 A1 | 11/2012 | Hashimoto et al. |

* cited by examiner

APPARATUS AND METHOD FOR TRANSMITTING DATA BASED ON COOPERATION OF MEMBER NODES BELONGING TO MULTICAST GROUP

CROSS-REFERENCE TO RELATED APPLICATIONS

This application claims the benefit under 35 USC §119(a) of Korean Patent Application No. 10-2013-0025699, filed on Mar. 11, 2013, in the Korean Intellectual Property Office, the entire disclosure of which is incorporated herein by reference for all purposes.

BACKGROUND

1. Field

The following description relates to a base station and a member node transmitting data based on cooperation of member nodes belonging to a multicast group, and methods thereof.

2. Description of Related Art

According to a rapid increase in use of various wireless devices including a smart phone and a tablet personal computer (PC) and relevant applications, wireless data traffic is also sharply increasing. Such an increase is expected to accelerate. Demands for a multicast service adopting a method of transmitting data from at least one transmitter to at least one specific receiver are also expected to increase. For data processing for video, audio, and joint document task or inter-group document transmission, a multicast protocol that secures reliability is required although a loss of time is incurred. However, to secure the reliability in the multicast transmission, lost packets need to be retransmitted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of transmitting data, the method including: transmitting multicast packets through a first communication network to member nodes belonging to a multicast group and the member nodes receiving the same multicast packets; and retransmitting the multicast packets based on whether any member node has completed reception of the multicast packets.

The method may include generating the multicast packets based on network coding.

The retransmitting may include retransmitting multicast packets newly coded with respect to the corresponding multicast packets.

The member nodes belonging to the multicast group may communicate with one another through a second communication network.

The first communication network may use a different communication method from a communication method of the second communication network.

The first communication network and the second communication network may use wireless resources orthogonal to each other when the first communication network and the second communication network use a same communication method.

The ACK message may notify that reception of all the multicast packets is complete at the member node.

In another general aspect, there is provided a method of transmitting data, the method including: receiving, at a member node of a multicast group, multicast packets from a base station through a first communication network; generating a network coding packet using the multicast packets based on an error generation rate in the multicast packets; and flooding the network coding packet to other member nodes of the multicast group through a second communication network.

The generating of the network coding packet may include: determining the error generation rate in the multicast packets; and generating the network coding packet using the multicast packets in response to the error generation rate being less than a predetermined threshold value.

The method may include receiving the network coding packet flooded from other member nodes in response to the error generation rate being greater than or equal to the predetermined threshold value; collecting the multicast packets received from the base station and the network coding packet received from other member nodes; determining whether reception of the multicast packets is completed; and transmitting a message related to the determining whether reception of the multicast packets is complete.

The flooding may include flooding the network coding packet to other member nodes of the multicast group through the second communication network until reception of a next multicast packet through the first communication network is completed.

The method may include stopping flooding of the network coding packet based on a message related to reception of the multicast packet, the message received through the second communication network from the member nodes belonging to the multicast group.

The message related to reception of the multicast packets may include any one of an acknowledge (ACK) message informing that reception of all the multicast packets is completed and a negative ACK (NACK) message informing that reception of the multicast packets is incomplete.

When the message related to reception of the multicast packets is the ACK message, the stopping may include: stopping flooding of the network coding packet based on whether a number of ACK messages is equal to a number of the member nodes of the multicast group.

When the message related to reception of the multicast packets is the NACK message, the stopping may include: stopping flooding of the network coding packet in response to not receiving another NACK message for a predetermined time after receiving the NACK message.

The first communication network may use a different communication method from a communication method of the second communication network.

The first communication network and the second communication network may use wireless resources orthogonal to each other when the first communication network and the second communication network use a same communication method.

The method may include generating a new network coding packet in response to a negative ACK (NACK) message informing that reception of the multicast packets is incomplete, being received.

The method may include generating a new network coding packet including ACK messages, when the number of ACK messages less than a number of the member nodes of the multicast group.

A non-transitory computer readable recording medium storing a program may cause a computer to execute the method.

In another general aspect, there is provided a device for transmitting data to member nodes belonging to a multicast group, the device including: a receiver configured to receive multicast packets from a base station through a first communication network; a packet generator configured to generate a network coding packet using the multicast packets based on an error generation rate in the multicast packets; and a transmitter configured to flood the network coding packet to other member nodes of the multicast group through a second communication network.

In another general aspect, there is provided a method of transmitting data, the method including: transmitting multicast packets through a first communication network to member nodes belonging to a multicast group and the member nodes receiving the same multicast packets; and retransmitting the multicast packets upon determination that no member node has completed reception of the multicast packets.

The retransmitting may include: determining whether an acknowledge (ACK) message is received through the first communication network from any member node within a predetermined time; and retransmitting the multicast packets in response to the ACK message not being received.

Other features and aspects will be apparent from the following detailed description, the drawings, and the claims.

Figure 1:
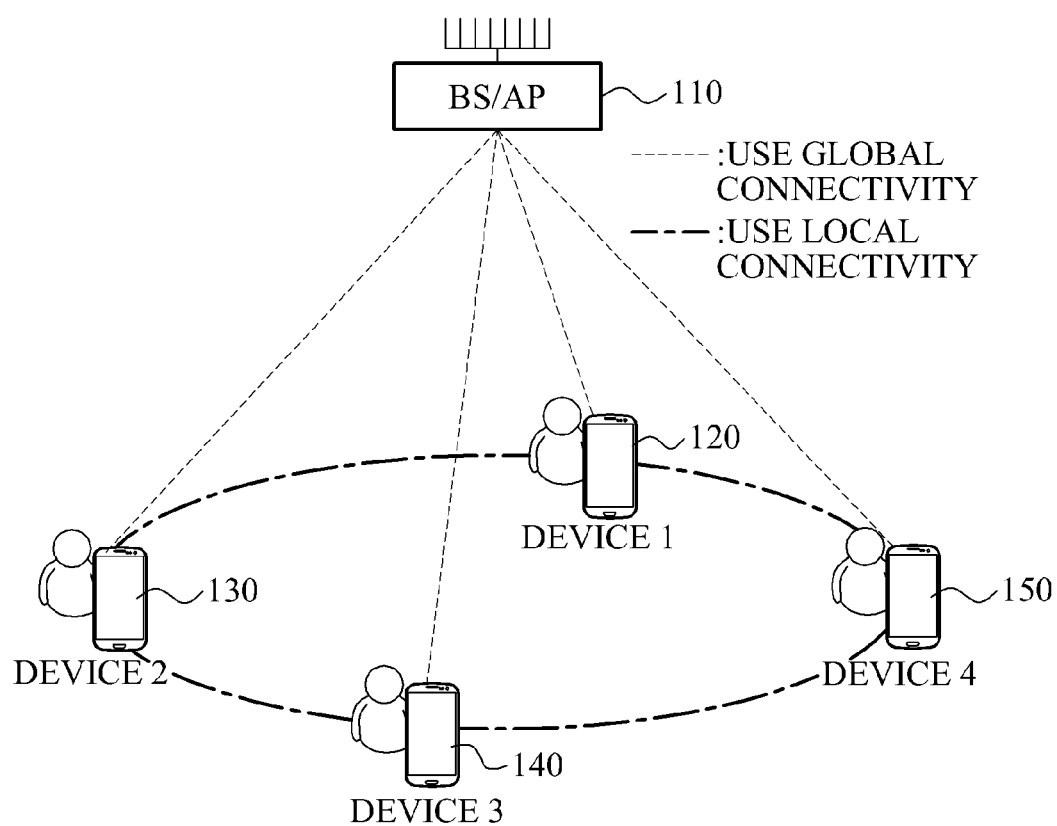
FIG. 1 is a diagram illustrating an example of increasing transmission rate by transmitting data based on cooperation of member nodes belonging to a multicast group.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of increasing a transmission rate by transmitting data based on cooperation of member nodes belonging to a multicast group. As a non-exhaustive illustration only, member nodes belonging to the multicast group described herein may refer to devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a netbook, a tablet personal computer (tablet), a phablet, a personal digital assistant (PDA), a digital camera, a portable game console, an MP3 player, a portable/personal multimedia player (PMP), a digital multimedia broadcasting, a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. The member nodes belonging to the multicast group may receive same multicast packets and cooperate with one another.

Referring to FIG. 1, member nodes 120, 130, 140, and 150 belonging to a multicast group may communicate with a base station or an access point (AP) 110 using global connectivity and communicate with one another using local connectivity.

Since the member nodes 120, 130, 140, and 150 belonging to the multicast group have different channel states or channel qualities, packet error rates of the member nodes 120, 130, 140, and 150 may be different even though same multicast packets are received at each member node. Considering such characteristics, according to a non-exhaustive example, a member node that has received a multicast packet having no error or a minor error may flood a multicast packet into the multicast group using local connectivity, thereby cooperate with other member nodes. Each of the member nodes may flood a particular number of received packets by multicasting. Thus, since the member nodes, which receive the same multicast packets cooperate, a multicast transmission rate may be increased. Network coding may be used for efficient flooding.

A first communication network may be used for global connectivity. The first communication network may include any communication method, such as, for example, a cellular network, a wireless local area network (WLAN), a wireless personal area network (WPAN), and a wireless fidelity (WiFi). A second communication network may be used for local connectivity. The second communication network may communication method, such as, for example, a cellular network, WLAN, WPAN, WiFi, Bluetooth, Zigbee, near field communication (NFC), and wireless gigabit alliance (WiGig).

The first communication network and the second communication network may use different communication methods. When the first communication network and the second communication network use a same communication method, the first communication network and the second communication network may communicate using wireless resources orthogonal to each other. For example, when the first communication network is a cellular network and the second communication network is also a cellular network, the first communication network may use wireless resources of the cellular network orthogonal to the second communication network.

By flooding the member nodes, the base station may continuously transmit other multicast packets without having to retransmit the multicast packets. As a result, the multicast transmission rate may be increased.

Figure 2:
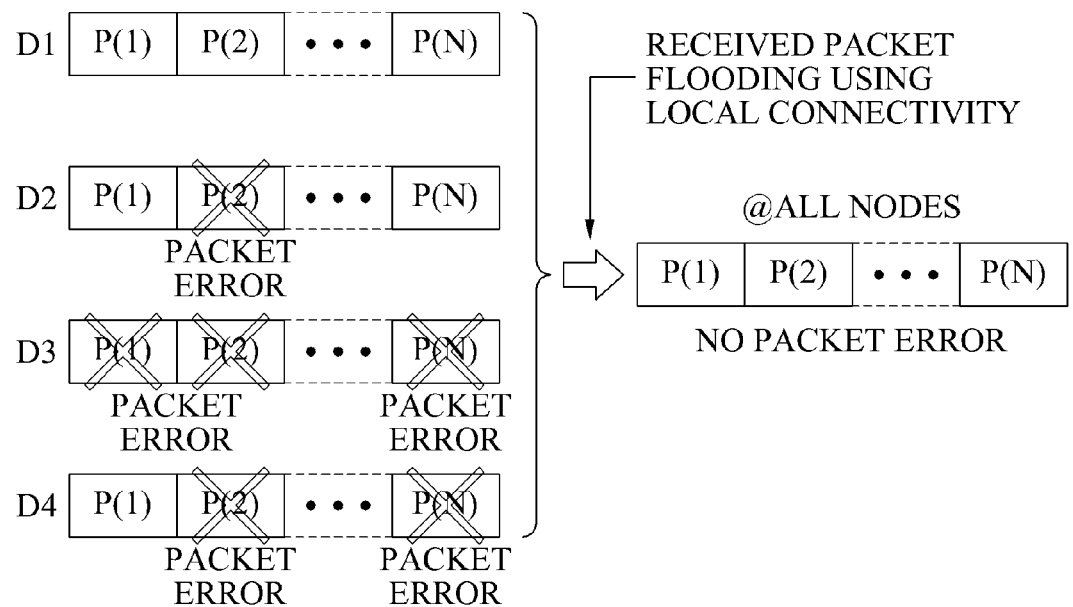
FIG. 2 is a diagram illustrating an example of flooding of packets according to a method of transmitting based on cooperation of member nodes belonging to a multicast group.

FIG. 2 is a diagram illustrating an example of flooding of packets according to a method of transmitting based on cooperation of member nodes belonging to a multicast group. Referring to FIG. 2, as aforementioned, the member nodes belonging to the multicast group may have different channel states. For example, a member node D1 having a good channel state may receive all packets without causing an error, whereas a member node D3 or a member node D4 having a bad channel state may not normally receive packets due to errors generated in most packets. In this state, member nodes receiving packets without an error or with a very low error rate, for example the member node D1 or a member node D2, may flood the multicast packets to other member nodes such as the member node D3 or the member node D4 using local connectivity. Therefore, all member nodes of the multicast group may receive all packets of the multicast packets without an error.

Figure 3:
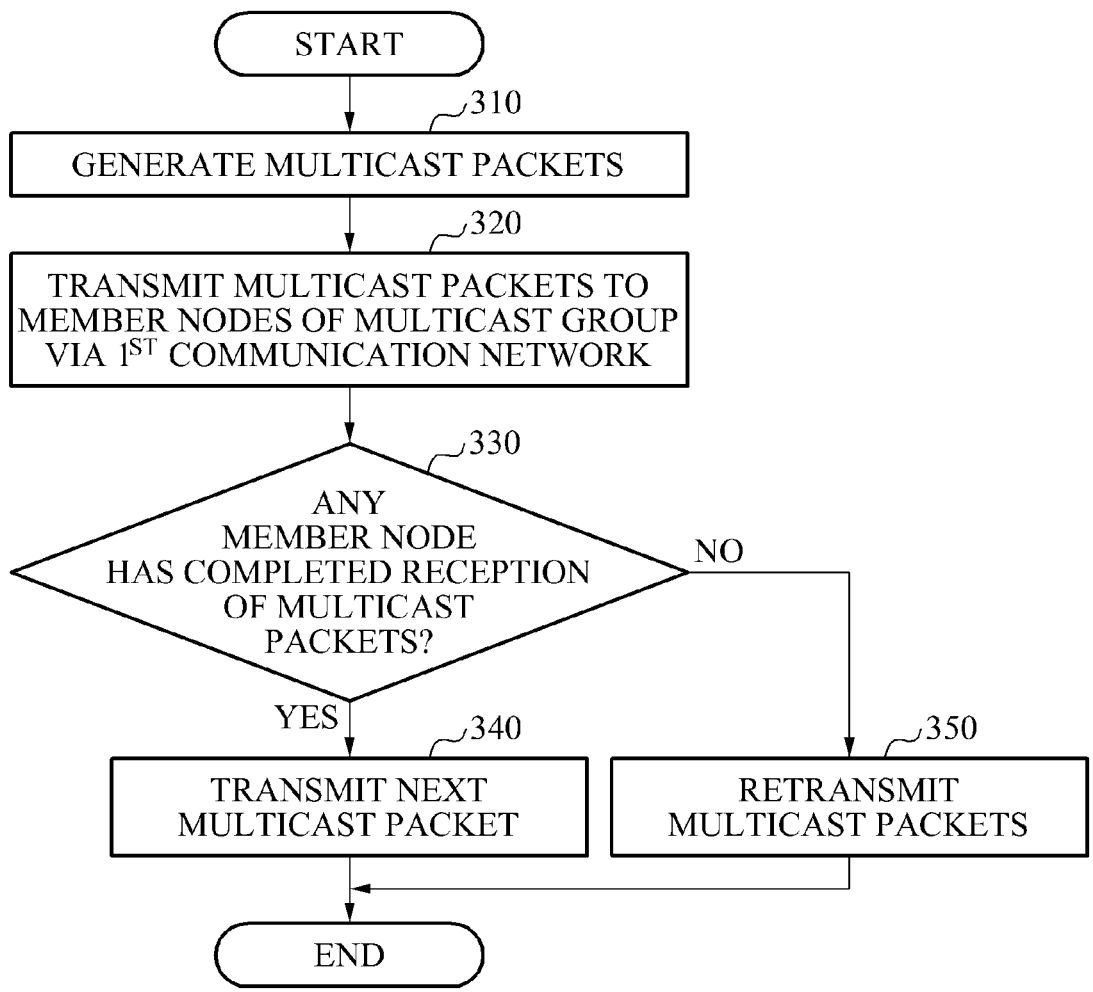
FIG. 3 is a diagram illustrating an example of a method of transmitting data by a base station based on cooperation of member nodes belonging to a multicast group.

FIG. 3 is a diagram illustrating an example of a method of transmitting data by a base station based on cooperation of member nodes belonging to a multicast group. In the following description, an AP may perform the operation of a base station. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently.

Referring to FIG. 3, in 310, the base station may generate multicast packets. The base station may generate the multicast packets by network coding.

In 320, the base station may transmit the multicast packets to the member nodes belonging to the multicast group through a first communication network. Here, the member nodes belonging to the multicast group may be devices that receive same multicast packets and cooperate with one another.

In 330, the base station may determine whether any one member node of the member nodes has completed reception of the multicast packets.

In 340, when any one member node of the member nodes has completed reception of the multicast packets, the base station may transmit a next multicast packet through the first communication network. Conversely, when it is determined in 330 that no member node has completed reception of the multicast packets, in 350, the base station may retransmit the multicast packets transmitted in 320. A method of retransmitting the multicast packets by the base station will be described with reference to FIG. 4.

Figure 4:
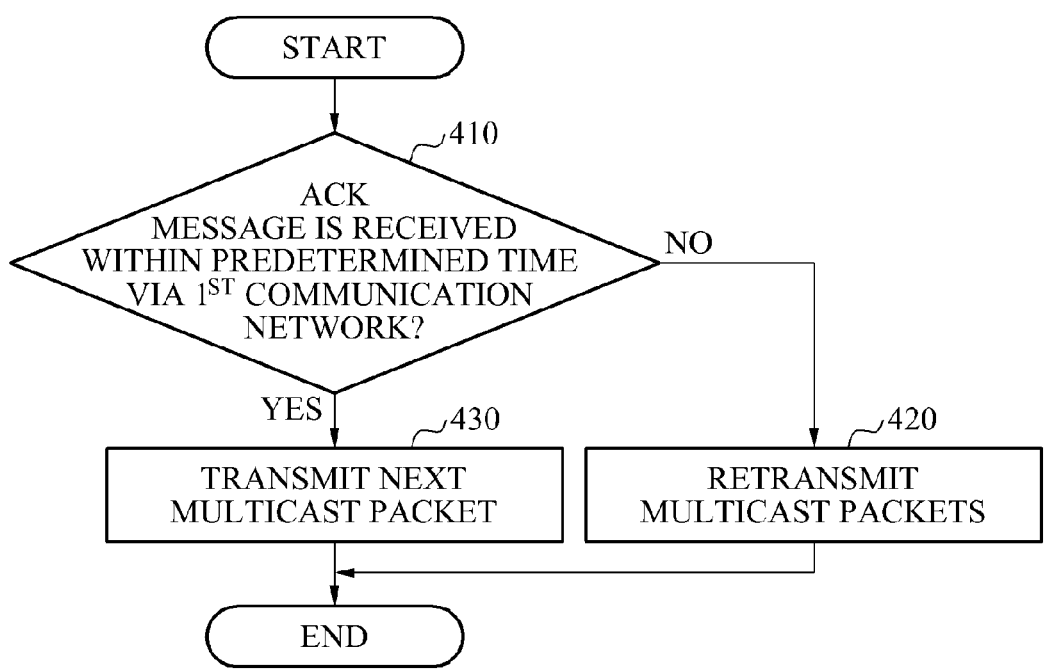
FIG. 4 is a diagram illustrating an example of a method of confirming whether any one member node among member nodes has completed reception of a multicast packet.

FIG. 4 is a diagram illustrating an example of a method of confirming whether any one member node among member nodes has completed reception of a multicast packet. In the following description, an AP may perform the operation of a base station. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently.

To report that the multicast packets are normally transmitted, a member node that first completed reception of all the multicast packets may transmit an acknowledge (ACK) message or a complete ACK message to a base station through a first communication network. The ACK message or the complete ACK message may inform that reception of all the multicast packets is completed.

In 410, the base station may determine whether the ACK message informing that reception of all the multicast packets is completed is received within a predetermined time through the first communication network. The ACK message may be received from any one member node among the member nodes belonging to the multicast group.

When the ACK message is received within the predetermined time in 410, in 430, the base station may transmit a next multicast packet to the member nodes through the first communication network. When the ACK message is not received within the predetermined time in 410, in 420, the base station may retransmit a multicast packet newly coded with respect to the corresponding multicast packet.

Figure 5:
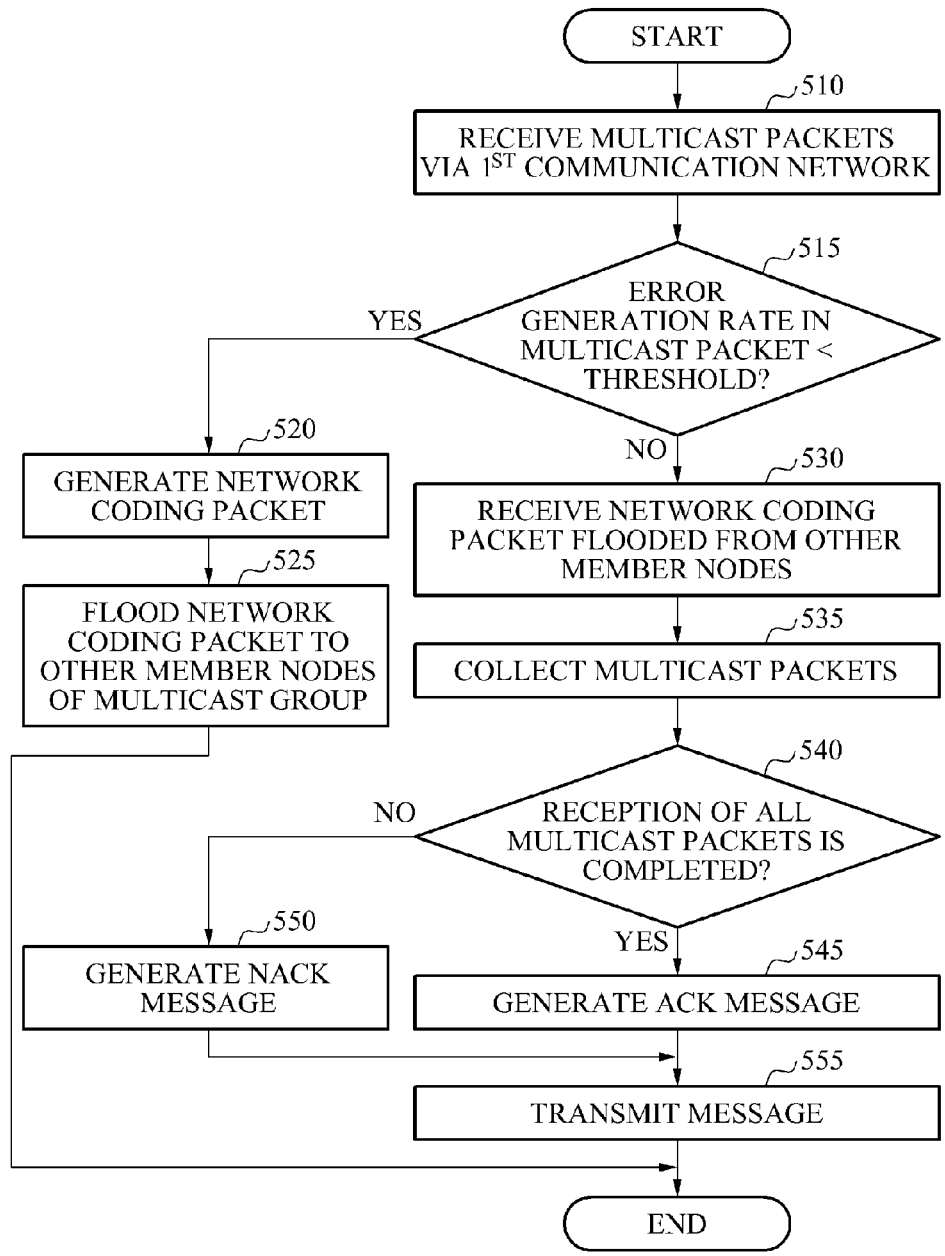
FIG. 5 is a diagram illustrating an example of a method of transmitting data by a member node based on cooperation of member nodes belonging to a multicast group.

FIG. 5 is a diagram illustrating an example of a method of transmitting data by a member node based on cooperation of member nodes belonging to a multicast group. In the following description, an AP may perform the operation of a base station. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently.

Referring to FIG. 5, in 510, the member nodes may receive multicast packets from the base station through a first communication network. The member nodes may operate in different manners by determining whether an error is generated in the multicast packets received in 510.

In 515, the member nodes belonging to the multicast group may each determine an error generation rate in the multicast packets received through the first communication network. The member nodes may determine whether an error generation rate is smaller than a predetermined threshold value.

When the error generation rate is smaller than the predetermined threshold value, in 520, the member nodes may generate a network coding packet using the multicast packets.

In 525, the member nodes may flood the network coding packet generated in 520 to other member nodes of the multicast group, for cooperation of the member nodes. Thus, a member node that has received the multicast packets with a low error rate or without an error may generate and transmit a new network coding packet using the received multicast packets to other member nodes of the multicast group. The member nodes of the multicast group may complete reception of the multicast packets using the network coding packet transmitted from the member node.

In 525, the member node may flood the network coding packet to other member nodes of the multicast group until reception of a next multicast packet through the first communication network is completed. Here, the member nodes of the multicast group may communicate with one another through a second communication network. In a non-exhaustive example, the member node may end flooding early before a flooding time assigned to the corresponding multicast packet is over. This non-exhaustive example will be described with reference to FIGS. 8 to 11. A framework for flooding will be described with reference to FIG. 7.

When it is determined in 515 that the error generation rate in the multicast packets is greater than or equal to the predetermined threshold value, in 530, the member node may receive the network coding packets from another member node that received the multicast packet with error generation rate smaller than a predetermined threshold value. The network coding packets received by the member node in 530 may be the network coding packets flooded from another member node.

In 535, the member node may collect the multicast packets received from the base station and the network coding packets received from other member nodes belonging to the multicast group. In 540, the member node may determine whether reception of all the multicast packets is completed according to a result of the collecting.

The member node may transmit a message related to reception of the multicast packets to other member nodes belonging to the multicast group, based on a result of determination of 540. The message related to reception of the multicast packets may include any one of an ACK message informing that reception of all the multicast packets is completed and a negative ACK (NACK) message informing that reception of the multicast packets is partially completed.

When it is determined in 540 that the reception of all the multicast packets is completed, the member node may generate the ACK message in 545. When it is determined in 540 that the reception of the multicast packets is partially completed, the member node may generate the NACK message in 550.

The member node may transmit the message generated in 545 or 550 to the multicast group through the second communication network in 555.

Figure 6:
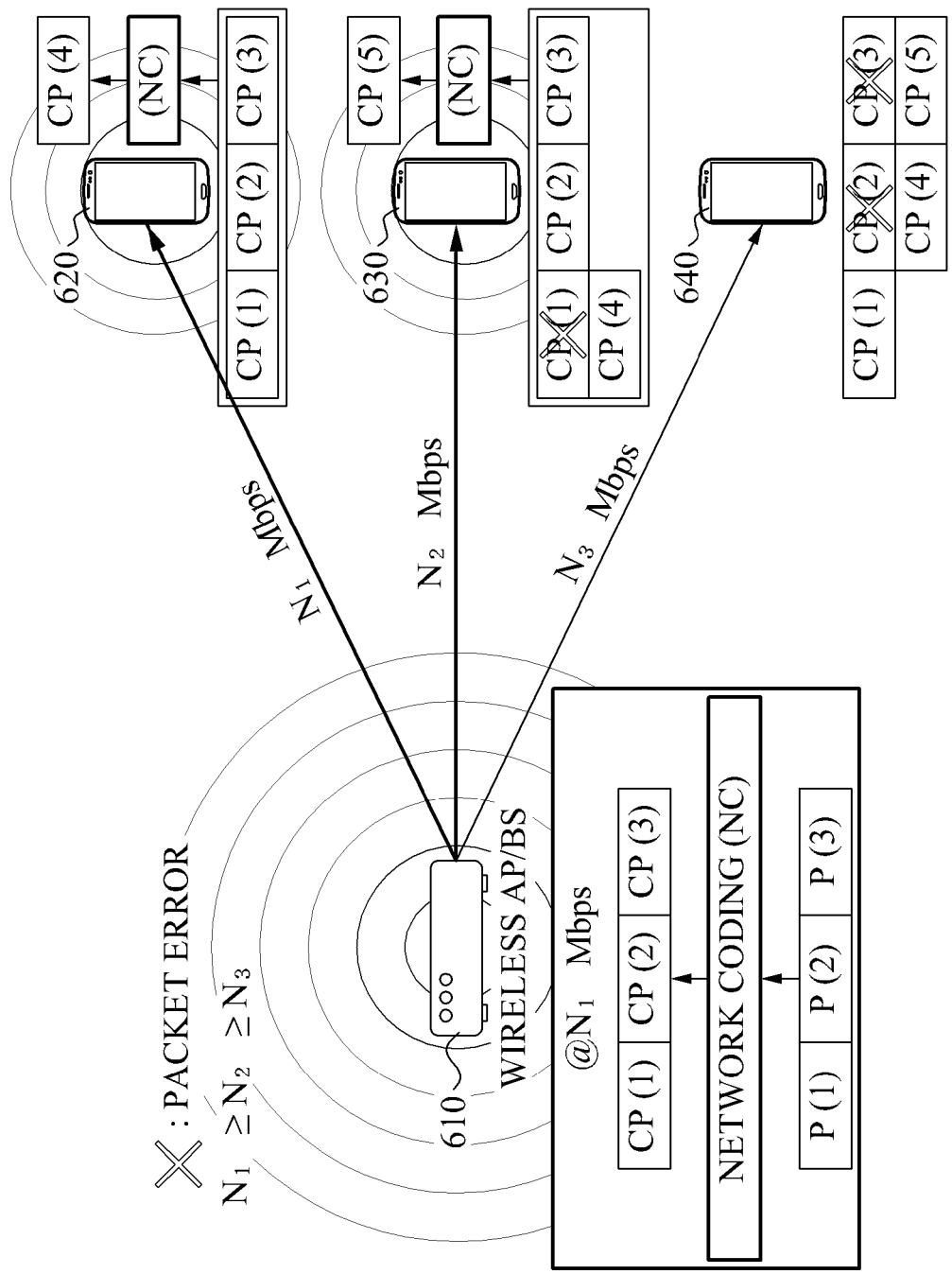
FIG. 6 is a diagram illustrating an example of a method of transmitting data based on cooperation of member nodes belonging to a multicast group.

FIG. 6 is a diagram illustrating an example of a method of transmitting data based on cooperation of member nodes belonging to a multicast group. Referring to FIG. 6, a base station or AP 610 may transmit three network coded packets CP(1), CP(2), and CP(3) into a multicast group through a first communication network. Three member nodes, a first member node 620, a second member node 630, and a third member node 640, may be included in the multicast group.

In a non-exhaustive example, the first member node 620 in the multicast group may receive packets at a transmission rate $N_1$ Mbps. The second member node 630 may receive packets at a transmission rate $N_2$ Mbps and the third member node 640 may receive packets at a transmission rate $N_3$ Mbps. The transmission rates satisfy the condition that $N_1 \geq N_2 \geq N_3$.

In a non-exhaustive example, the first member node 620 received the three network coded packets CP(1), CP(2), and CP(3) without an error, an error is generated in the packet CP(1) in the second member node 630, and an error is generated in the packets CP(2) and CP(3) in the third member node 640.

The base station or AP 610 may transmit the packets to member nodes by a highest optimal data transmission rate $N_1$ Mbps corresponding to a channel capacity of a member node having a best channel state, for example the first member node 620. Accordingly, the base station may increase the transmission rate for multicast packets.

The first member node 620 that received all packets without any error may generate a newly coded packet, for example, the packet CP(4), using the three packets CP(1), CP(2), and CP(3) that it received. The first member node 620 may flood the newly coded packet CP(4) through a second communication network for local connectivity. In the same manner, the second member node 630 that received the packets CP(2) and CP(3) without any error may generate a newly coded packet, for example a packet CP(5), using the packets CP(2) and CP(3), and flood the newly coded packet CP(5) through the second communication network.

The third member node 640 in which an error is generated in the packets CP(2) and CP(3) may receive newly coded packets CP(4) and CP(5) from the first member node 620 and the second member node 630, respectively. Thus, by repeating the foregoing process, all member nodes in the multicast group may receive as many coded packets as is needed from the base station or AP 610 without having to retransmit the packets CP(2) and CP(3).

Figure 7:
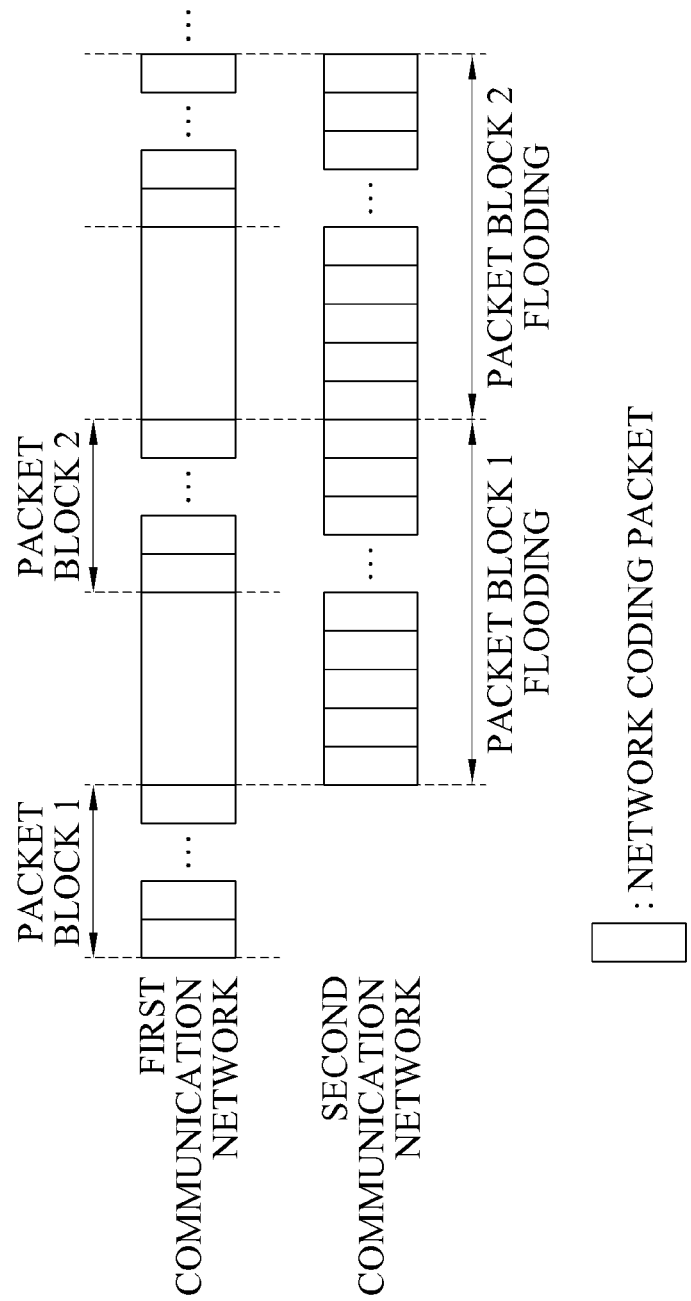
FIG. 7 is a diagram illustrating an example of a framework for flooding according to a method of transmitting data based on cooperation of member nodes belonging to a multicast group.

FIG. 7 is a diagram illustrating an example of a framework for flooding according to a method of transmitting data based on cooperation of member nodes belonging to a multicast group. Referring to FIG. 7, a base station or AP may transmit a multicast packet or a unicast packet to group members using a first communication network for global connectivity.

A second communication network may be used for local connectivity between member nodes belonging to a multicast group. The first communication network and the second communication network may use different communication methods. When the same communication method is used, the first communication network and the second communication network may flood packets received by member nodes using wireless resources orthogonal to each other.

Flooding of a packet block executed in the second communication network, for example a packet block 1, may be performed until reception of a next packet block, for example a packet block 2, is completed in the first communication network. In a non-exhaustive example, the flooding may be ended early or stopped before a flooding time assigned to a corresponding packet block is over.

Figure 8:
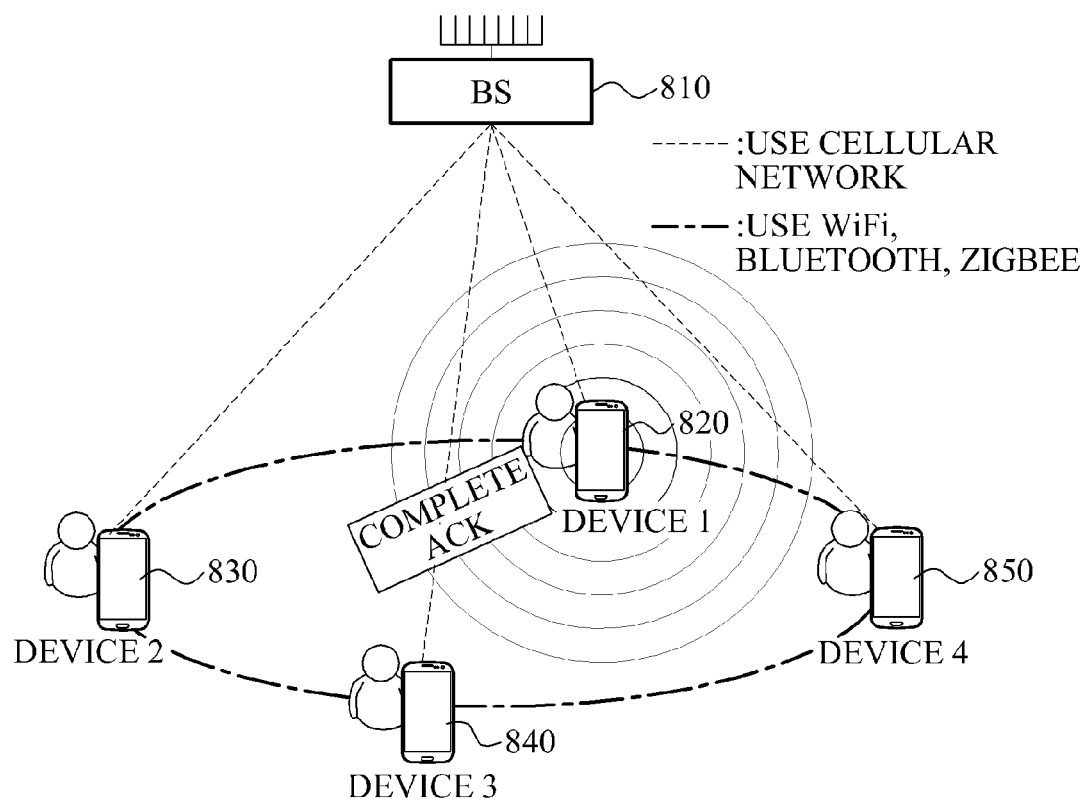
FIG. 8 is a diagram illustrating an example of stopping flooding based on an acknowledge (ACK) message.

FIG. 8 is a diagram illustrating an example of stopping flooding based on an ACK message. Referring to FIG. 8, member nodes 820, 830, 840, and 850 belonging to a multicast group may communicate with a base station 810 or a AP using a first communication network for global connectivity, for example a cellular network. The member nodes 820, 830, 840, and 850 may communicate with one another using a second communication network for local connectivity. For example, the second communication network may include any one of the cellular network, WLAN, WPAN, WiFi, Bluetooth, Zigbee, NFC, and WiGig.

Each of the member nodes 820, 830, 840, and 850 may receive an N-number of network coded multicast packets from the base station 810 or other member nodes. The member nodes 820, 830, 840, and 850 may transmit a complete ACK message into the multicast group through the second communication network, when all coded packets are successfully received. Therefore, when all the member nodes 820, 830, 840, and 850 of the multicast group have sent the complete ACK message, a member node performing flooding may stop packet flooding even before the time of flooding is over. Thus, the member nodes may stop flooding of a network coding packet based on receiving a message related to reception of packets from other member nodes of the multicast group through the second communication network.

Figure 9:
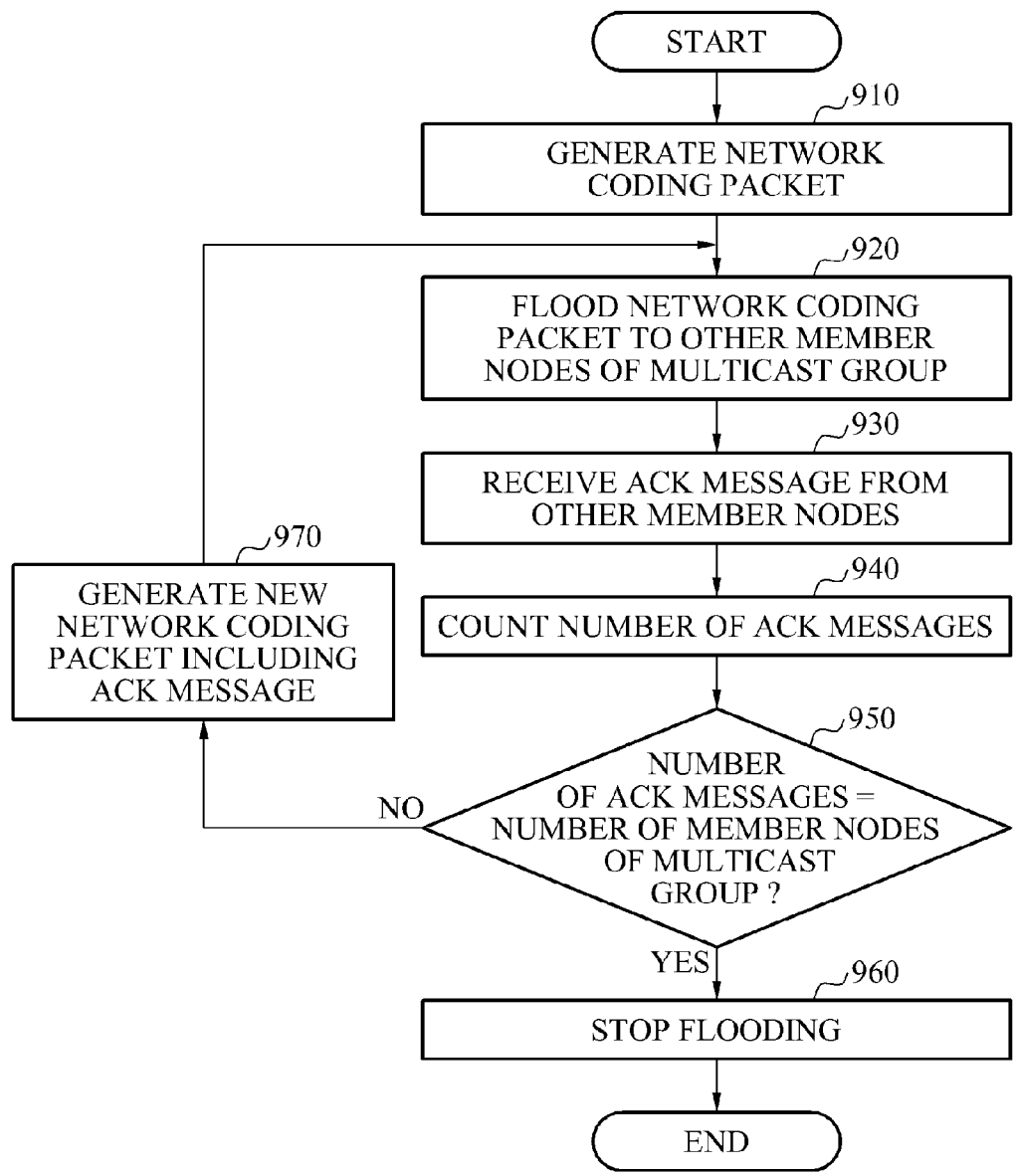
FIG. 9 is a diagram illustrating an example of a method of stopping flooding based on an ACK message according to a method of transmitting data based on cooperation of member nodes belonging to a multicast group.

FIG. 9 is a diagram illustrating an example of a method of stopping flooding based on an ACK message according to a method of transmitting data based on cooperation of member nodes belonging to a multicast group. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently.

As described above with reference to FIG. 5, in 910, when an error generation rate in a multicast packet is smaller than a predetermined threshold value, a member node may generate a network coding packet using a multicast packet. In 920, for cooperation of member nodes, the member node may flood the network coding packet to other member nodes of the multicast group.

In a non-exhaustive example, other member nodes may receive multicast packets flooded from the base station and the network coding packets from the corresponding member node. In addition, other member nodes that completed receiving all the multicast packets may transmit an ACK message through the second communication network. The ACK message reports that the informing that reception of the multicast packets is completed.

In 930, the member node may receive ACK messages from other member nodes. In 940, the member node may count a number of the ACK messages received. Based on the count in 940, in 950, the member node may determine whether the number of the ACK messages is equal to a number of the member nodes belonging to the multicast group. When the number of the ACK messages is equal to the number of the member nodes belonging to the multicast group, in 960, the member node may stop flooding of the network coding packets.

Conversely, when the number of the ACK messages is not equal, i.e., is smaller than the number of the member nodes, in 970, the member node may generate a new network coding packet including the ACK message. The member node may return to 920 to flood the new network coding packet. Here, the member node may transmit the ACK message only once by including the ACK message in the new network coding packet.

Figure 10:
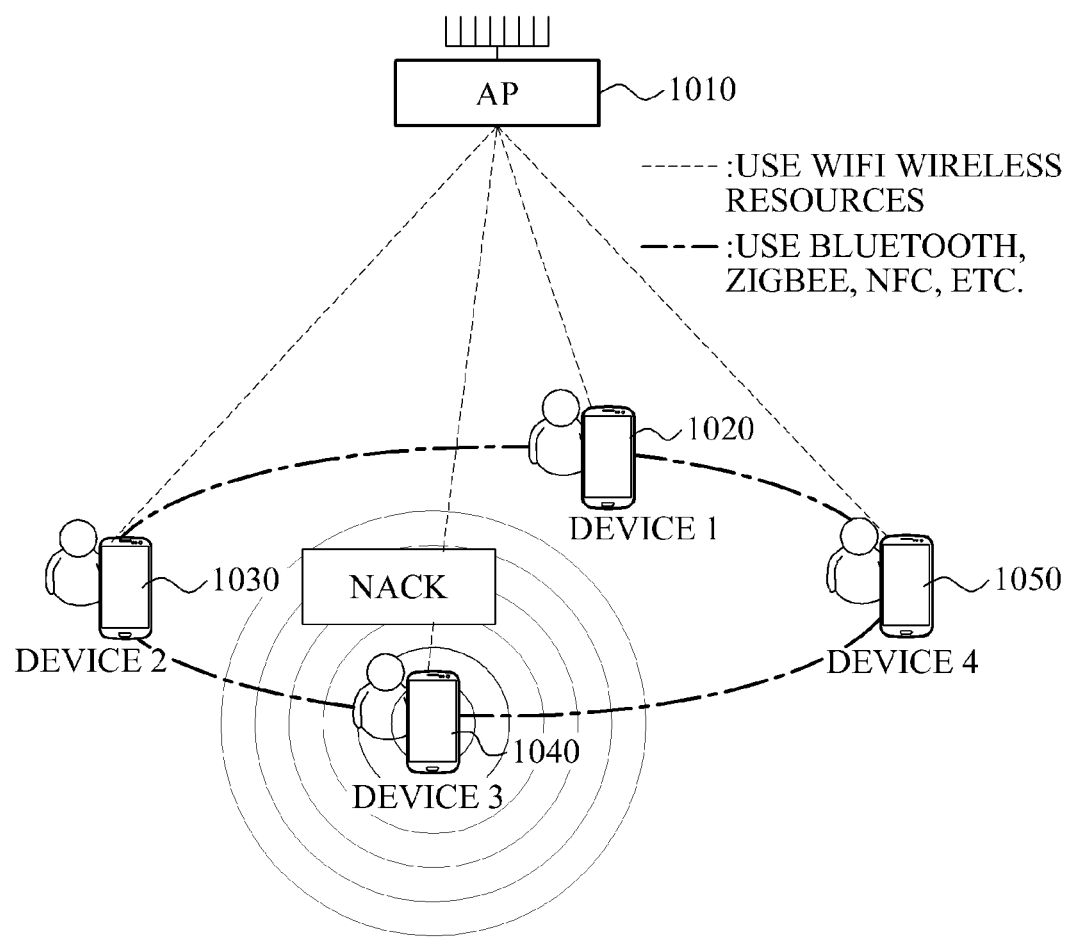
FIG. 10 is a diagram illustrating an example of stopping flooding based on a negative ACK (NACK) message.

FIG. 10 is a diagram illustrating an example of stopping flooding based on a NACK message.

Referring to FIG. 10, member nodes 1020, 1030, 1040, and 1050 belonging to a multicast group may communicate with a AP 1010 or a base station using a first communication network for global connectivity, for example WiFi wireless resources. The member nodes may communicate with one another using a second communication network for local connectivity. For example, the second communication network may include any one of WLAN, WPAN, WiFi, Bluetooth, Zigbee, NFC, and WiGig.

Each of the member nodes 1020, 1030, 1040, and 1050 may receive an N-number of network coded multicast packets from the AP 1010 or from other member nodes. A member node that received only a part of the N-number of network coded packets and therefore needs additional packets may transmit a NACK message through a second communication network. When no NACK messages are received within a predetermined time, a member node that received all packets or a member node that received packets with a relatively low error rate in the multicast group may consider that all member nodes in the multicast group have received the packets and accordingly stop flooding of packets early.

Figure 11:
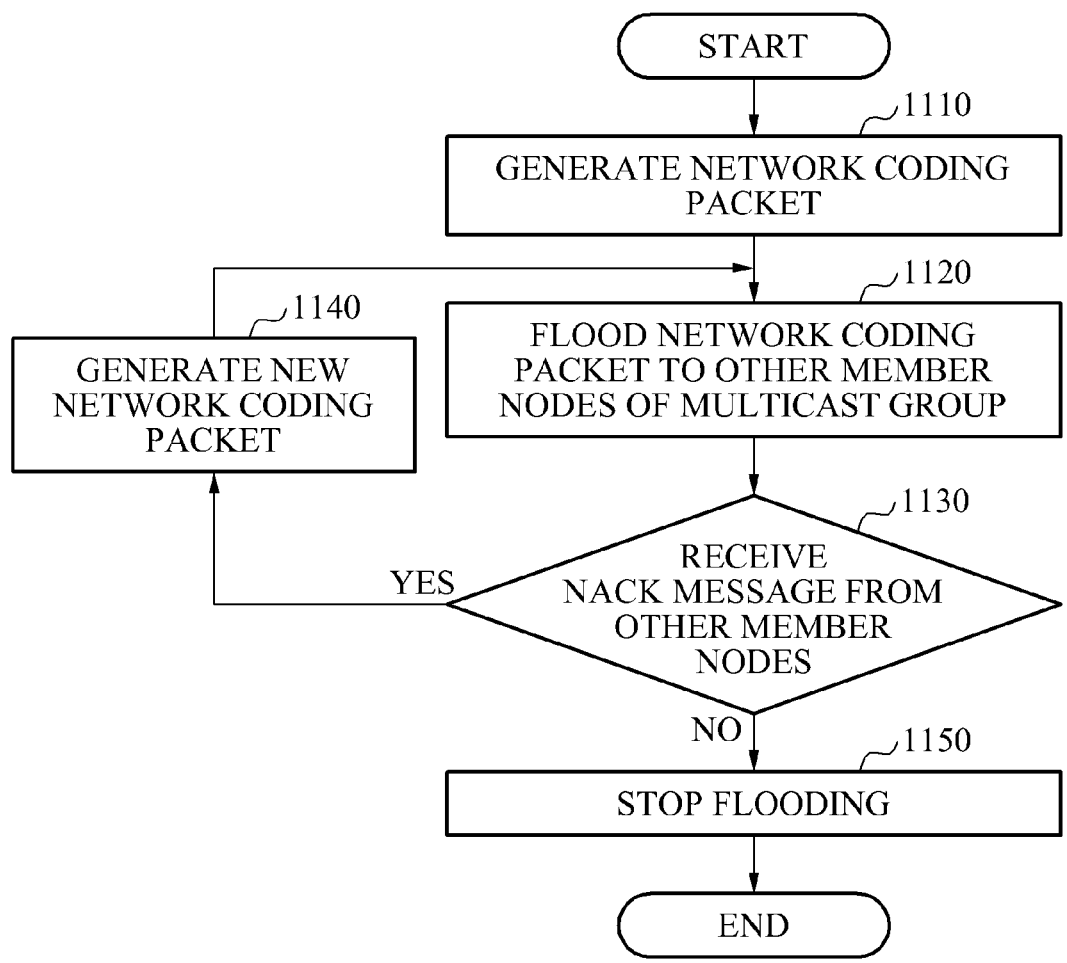
FIG. 11 is a diagram illustrating an example of a method of stopping flooding based on a NACK message according to a method of transmitting data based on cooperation of member nodes belonging to a multicast group.

FIG. 11 is a diagram illustrating an example of a method of stopping flooding based on a NACK message according to a method of transmitting data based on cooperation of member nodes belonging to a multicast group. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently.

As described above with reference to FIG. 5, in 1110, when an error generation rate in a multicast packet is smaller than a predetermined threshold value, a member node may generate a network coding packet using the multicast packet. In 1120, for cooperation of member nodes, the member node may flood the network coding packet to other member nodes of the multicast group.

In a non-exhaustive example, other member nodes may receive the multicast packets flooded from a base station and the network coding packet from the corresponding member node. Here, other member nodes that received some of the packets may transmit an NACK message through a second communication network, reporting that reception of multicast packets is partially completed.

In 1130, the member node may determine whether the NACK message is received from other member nodes of the multicast group.

When a NACK message is received from other member nodes in 1130, in 1140, the member node may generate a new network coding packet using the multicast packets. Again, in 1120, the member node may flood the new network coding packet to other member nodes. Conversely, when there is no NACK message received from other member nodes in 1130, the member node may stop flooding in 1150. Here, absence of a NACK message received from other member nodes means that all the member nodes received the multicast packets.

Figure 12:
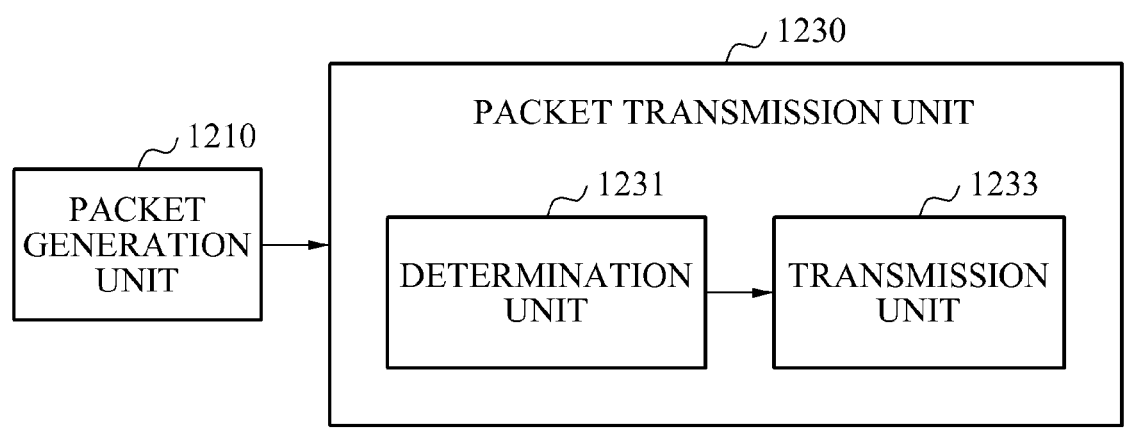
FIG. 12 is a diagram illustrating an example of a base station that transmits data based on cooperation of member nodes belonging to a multicast group.

FIG. 12 is a block diagram illustrating an example of a base station that transmits data based on cooperation of member nodes belonging to a multicast group. Referring to FIG. 12, the base station may include a packet generation unit 1210 and a packet transmission unit 1230. The packet generation unit 1210 may generate multicast packets by network coding.

The packet transmission unit 1230 may transmit the multicast packets to member nodes belonging to a multicast group through a first communication network. In addition, the packet transmission unit 1230 may retransmit the multicast packets based on whether any one member node has completed reception of the multicast packets. The member nodes may be devices that receive same multicast packets and cooperate with one another.

The packet transmission unit 1230 may include a determination unit 1231 and a transmission unit 1233. The determination unit 1231 may determine whether an ACK message is received from any one member node among the member nodes belonging to the multicast group. The ACK message may report, through the first communication network, that all the multicast packets are received within a predetermined time at one member node among the member nodes belonging to the multicast group. The transmission unit 1233 may retransmit the multicast packets to the member nodes through the first communication network based on a determination result of the determination unit 1231.

Figure 13:
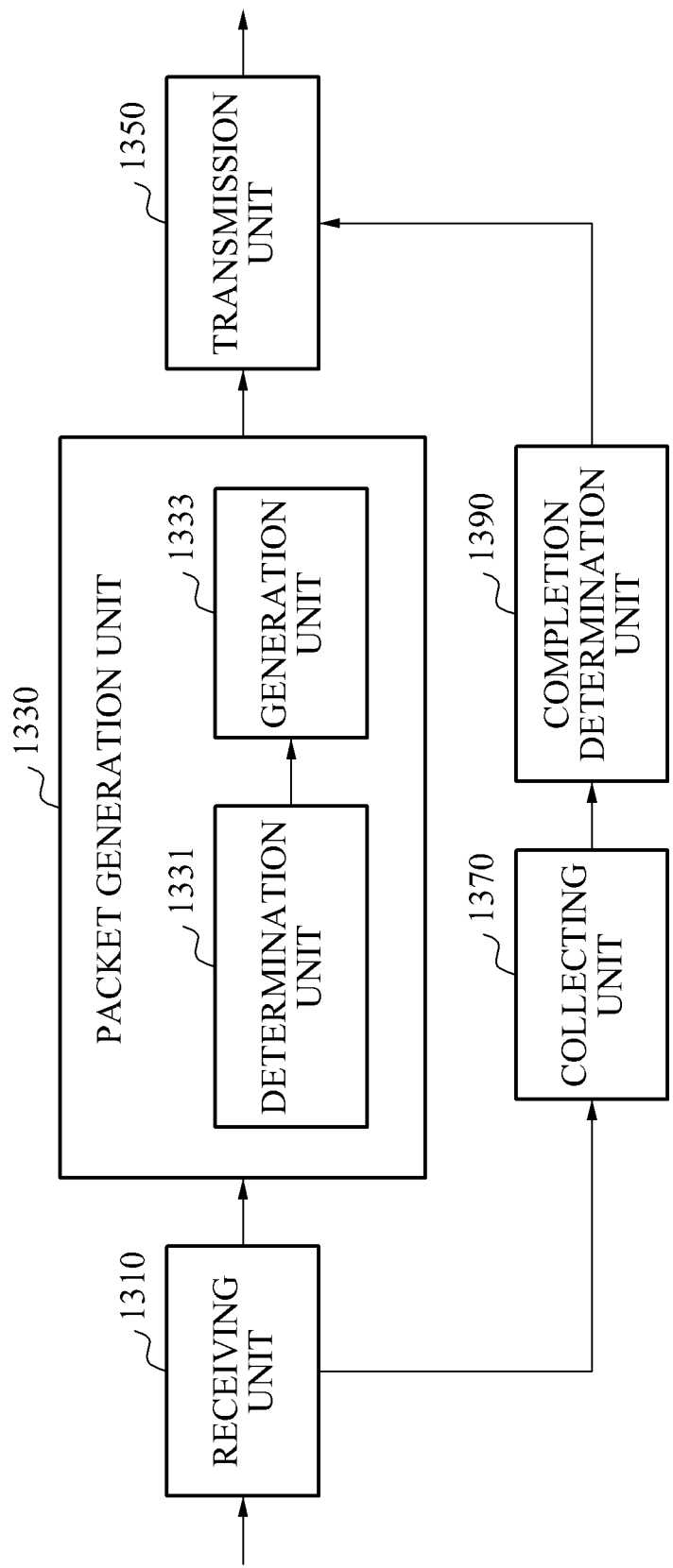
FIG. 13 is a diagram illustrating an example of a member node that transmits data based on cooperation of member nodes belonging to a multicast group.

FIG. 13 is a block diagram illustrating an example of a member node that transmits data based on cooperation of member nodes belonging to a multicast group. Referring to FIG. 13, the member node may include a receiving unit 1310, a packet generation unit 1330, a transmission unit 1350, a collecting unit 1370, and a completion determination unit 1390.

The receiving unit 1310 may receive multicast packets from a base station or AP through a first communication network. The packet generation unit 1330 may generate a network coding packet using the multicast packets based on whether an error is generated in the multicast packets. The packet generation unit 1330 may include a determination unit 1331 and a generation unit 1333. The determination unit 1331 may determine whether an error generation rate in the multicast packets is smaller than a predetermined threshold value. When the error generation rate is greater than or equal to the predetermined threshold value, the receiving unit 1310 may receive a network coding packet flooded from other member nodes. The collecting unit 1370 may collect the multicast packets received from the base station and the network coding packets from other member nodes belonging to the multicast group. The completion determination unit 1390 may determine whether the collecting unit 1370 received all the multicast packets.

Based on a result of the completion determination unit 1390, the transmission unit 1350 may transmit a message related to reception of the multicast packets to other member nodes belonging to the multicast group. The generation unit 1333 may generate a network coding packet using the multicast packets based on the result of the determination unit 1331.

For cooperation of the member nodes, the transmission unit 1350 may flood the network coding packet to other member nodes of the multicast group. The member nodes of the multicast group may be interconnected through a second communication network. The transmission unit 1350 may flood the network coding packet to other member nodes of the multicast group through the second communication network, until reception of a next multicast packet through the first communication network is completed.

The transmission unit 1350 may stop flooding of the network coding packet based on the message related to reception of the packets received from the member nodes of the multicast group through the second communication network. The message related to reception of the packets may include an ACK message informing that reception of all the multicast packets is completed and a NACK message informing that reception of the multicast packets is partially completed.

When the message related to reception of the packets is the ACK message informing that reception of all the multicast packets is completed, the transmission unit 1350 may stop flooding of the network coding packet based on whether a number of the ACK messages are equal to a number of the member nodes belonging to the multicast group. When the message is the NACK message informing that reception of the multicast packets is partially completed, the transmission unit 1350 may stop flooding of the network coding packet. If the member node does not receive the NACK message from another member node for a predetermined time after receiving an earlier NACK message, the transmission unit 1350 may stop flooding of the network coding packet. When the member node receives continuous NACK messages within a predetermined time, the transmission unit 1350 may flood the network coding packet to other member nodes of the multicast group through the second communication network, until reception of a next multicast packet through the first communication network is completed.

According to non-exhaustive examples, continuous packet transmission may be enabled without retransmission of packets in a base station or AP through cooperation of member nodes in multicast transmission. Accordingly, a multicast transmission rate may be increased.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of transmitting data, the method comprising:
receiving, at a member node of a multicast group, multicast packets from a base station through a first communication network;
generating a first network coding packet using the multicast packets based on an error generation rate in the multicast packets;
transmitting the first network coding packet to other member nodes of the multicast group through a second communication network;
determining the error generation rate in the multicast packets; and
collecting the multicast packets received from the base station and a second network coding packet received from the other member nodes in response to the error generation rate being greater than or equal to a predetermined threshold value.

2. The method of claim 1, wherein the generating of the network coding packet comprises:
determining the error generation rate in the multicast packets; and
generating the network coding packet using the multicast packets in response to the error generation rate being less than a predetermined threshold value.

3. The method of claim 2, further comprising:
determining whether a reception of the multicast packets is completed; and
transmitting a message related to the determining whether the reception of the multicast packets is complete.

4. The method of claim 1, wherein the transmitting comprises
transmitting the first network coding packet to the other member nodes of the multicast group through the second communication network until a reception of a next multicast packet through the first communication network is completed.

5. The method of claim 1, further comprising:
stopping transmitting of the first network coding packet based on a message related to a reception of the multicast packets, wherein the message received through the second communication network from the member nodes belonging to the multicast group.

6. The method of claim 5, wherein the message related to reception of the multicast packets comprises any one of an acknowledge (ACK) message informing that reception of all the multicast packets is completed and a negative ACK (NACK) message informing that reception of the multicast packets is incomplete.

7. The method of claim 6, wherein, when the message related to reception of the multicast packets is the ACK message, the stopping comprises:
stopping transmitting of the first network coding packet based on whether a number of ACK messages is equal to a number of the member nodes of the multicast group.

8. The method of claim 6, wherein, when the message related to reception of the multicast packets is the NACK message, the stopping comprise:
stopping transmitting of the first network coding packet in response to not receiving another NACK message for a predetermined time after receiving the NACK message.

9. The method of claim 1, wherein the first communication network uses a different communication method from a communication method of the second communication network.

10. The method of claim 1, wherein the first communication network and the second communication network use wireless resources orthogonal to each other when the first communication network and the second communication network use a same communication method.

11. The method of claim 1, further comprising generating a new network coding packet in response to a negative ACK (NACK) message, informing that a reception of the multicast packets is incomplete, being received.

12. The method of claim 1, further comprising generating a new network coding packet including ACK messages in response to a number of ACK messages being less than a number of the member nodes of the multicast group.

13. A non-transitory computer readable recording medium storing a program to cause a computer to:
receive, at a member node of a multicast group, multicast packets from a base station through a first communication network;
generate a first network coding packet using the multicast packets based on an error generation rate in the multicast packets;
transmit the first network coding packet to other member nodes of the multicast group through a second communication network;
determine the error generation rate in the multicast packets; and
collect the multicast packets received from the base station and a second network coding packet received from the other member nodes in response to the error generation rate being greater than or equal to a predetermined threshold value.

14. A device for transmitting data to member nodes belonging to a multicast group, the device comprising:
- a receiver configured to receive multicast packets from a base station through a first communication network;
- a packet generator configured to generate a first network coding packet using the multicast packets based on an error generation rate in the multicast packets; and
- a transmitter configured to transmit the first network coding packet to other member nodes of the multicast group through a second communication network; and
- the packet generator is further configured to:
    - determine the error generation rate in the multicast packets; and
    - collect the multicast packets received from the base station and a second network coding packet received from the other member nodes in response to the error generation rate being greater than or equal to a predetermined threshold value.

15. The device of claim 14, wherein each of the multicast packets comprises a first packet block and a second packet block, and
- the transmitter configured to transmit a network coding packet of the first packet block to the other member nodes of the multicast group until a reception of a next packet block is completed.

* * * * *